US007457306B2

(12) United States Patent
Watanabe et al.

(10) Patent No.: US 7,457,306 B2
(45) Date of Patent: *Nov. 25, 2008

(54) WIRELESS NETWORK SYSTEM AND COMMUNICATION METHOD EMPLOYING BOTH CONTENTION MODE AND CONTENTION-FREE MODE

(75) Inventors: Yoshinori Watanabe, Kanagawa (JP); Hirokazu Kobayashi, Kanagawa (JP); Hiroshi Doi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 822 days.

This patent is subject to a terminal disclaimer.

(21) Appl. No.: 10/902,823

(22) Filed: Aug. 2, 2004

(65) Prior Publication Data

US 2005/0002373 A1   Jan. 6, 2005

Related U.S. Application Data

(63) Continuation of application No. 09/665,674, filed on Sep. 20, 2000, now Pat. No. 6,791,996.

(30) Foreign Application Priority Data

Sep. 22, 1999  (JP) ................................. 11-268627
May 9, 2000    (JP) ............................. 2000-135712

(51) Int. Cl.
    *H04B 7/212*  (2006.01)
(52) U.S. Cl. .................. 370/442; 370/346; 370/348; 370/338; 370/461; 370/448; 370/468; 370/445; 370/235; 370/352; 455/25; 709/224
(58) Field of Classification Search ............... 370/346, 370/338, 310, 447, 445, 458, 348, 352, 468, 370/235, 461; 709/224; 726/23; 342/367; 455/25
See application file for complete search history.

(56) References Cited

U.S. PATENT DOCUMENTS 4,789,983 A   12/1988   Acampora et al.
5,297,144 A    3/1994   Gilbert et al.

(Continued)

FOREIGN PATENT DOCUMENTS

EP      0773651      5/1997

(Continued)

*Primary Examiner*—Rafael Pérez-Gutiérrez
*Assistant Examiner*—Joseph Arévalo
(74) *Attorney, Agent, or Firm*—Dickinson Wright, PLLC

(57) ABSTRACT

A network communication system is provided whereby communication stations can obtain priority for data transmission to communicate directly with each other in a contention-free mode communication period independently of a polling operation of the control station. The control station emits a series of beacons at equal intervals to initiate contention-free mode communication at the completion of a predetermined number of beacons. During the maximum contention-free mode communication period a contention-free communication operation is initiated, for allowing contention-free mode transmission, by a polling operation by the control station. A series of time-slots is imaginarily provided at equal intervals from the start of the contention-free period throughout the maximum contention-free period. A communication station conducts a call-connection procedure in order to obtain a priority for data transmission in a given set of time-slots.

30 Claims, 15 Drawing Sheets

U.S. PATENT DOCUMENTS

| | | | |
|---|---|---|---|
| 5,390,165 A | 2/1995 | Tuch | |
| 5,644,576 A | 7/1997 | Bauchot et al. | |
| 5,970,062 A | 10/1999 | Bauchot | |
| 5,973,609 A | 10/1999 | Schoch | |
| 6,014,406 A | 1/2000 | Shida et al. | |
| 6,240,083 B1 * | 5/2001 | Wright et al. | 370/348 |
| 7,099,671 B2 * | 8/2006 | Liang | 455/450 |
| 2003/0083095 A1 * | 5/2003 | Liang | 455/552 |
| 2007/0140230 A1 * | 6/2007 | Beshai | 370/360 |
| 2007/0153821 A1 * | 7/2007 | Beshai | 370/437 |
| 2007/0171862 A1 * | 7/2007 | Tang et al. | 370/329 |

FOREIGN PATENT DOCUMENTS

| | | |
|---|---|---|
| JP | 58015344 | 1/1983 |
| JP | 1212141 | 8/1989 |
| JP | 6104895 | 4/1994 |
| JP | 7255092 | 10/1995 |
| JP | 7312602 | 11/1995 |
| JP | 8084148 | 3/1996 |
| JP | 8298687 | 11/1996 |
| JP | 9116562 | 5/1997 |
| JP | 9135248 | 5/1997 |
| JP | 11-331927 | 11/1999 |

* cited by examiner

FIG. 12

| Time-Slot No. | Caller Address | Receiver Address | Call No. | Time-Slot Change Request | Time-Slot Change Acknowledgement |
|---|---|---|---|---|---|
| 0-1 | Station 2 | Station 3 | 1000 | No | No |
| 0 | Station 4 | Station 5 | 23 | No | No |
| 1 | Station 2 | Station 4 | 1001 | No | No |
| 1 | Station 3 | Station 5 | 409 | Yes | No |
| 2 | Station 4 | Station 5 | 900 | No | No |
| | | | | | |
| | | | | | |
| | | | | | |
| | | | | | |

WIRELESS NETWORK SYSTEM AND COMMUNICATION METHOD EMPLOYING BOTH CONTENTION MODE AND CONTENTION-FREE MODE

This is a continuation of application Ser. No. 09/665,674 filed Sep. 20, 2000 now U.S. Pat. No. 6,791,996.

FIELD OF THE INVENTION

The present invention relates to a communication method and wireless network system for exchanging data in the form of digital signals.

DESCRIPTION OF THE RELATED ART

One known data communication system with wireless transmission technology is the accessing method specified in IEEE 802.11. Such a wireless network system is schematically explained referring to FIG. 15.

In the FIG. 15 system, upon finding that a particular transmission channel is active, control station 1 (an accessing point) transmits a control signal of a constant period, called a beacon. Control station 1 controls a group of communication stations 2, 3, 4, 5, and 6 for exchanging packets of data. The communication stations 2-6 are notified by the beacon that the channel is active. Each communication station then registers itself as a subscriber for data exchange under control station 1. Then, the communication station is qualified to participate in packet data communication on the transmission channel.

The exchanged data may usually be classified into two types, asynchronous data (common computer oriented data), which are less susceptible to transmission delay and jitter, and synchronous data (video data or the like), which are highly susceptible to transmission delay and jitter. It is assumed that communication stations 2, 3, 4, and 5 handle both types of data while communication station 6 handles only synchronous data.

A common contention mode communication technique will now be explained. Before starting communication in a contention mode., the communication station monitors or senses the carrier transmitted over the channel within a predetermined period of a distributed interframe space (DIFS). Only when the carrier is not found and the transmission channel is free, can the transmission of packets be started. This is known as carrier sense multiple access (CSMA).

When the carrier is present and the transmission channel is busy, the transmission starts just after the expiration of a random duration of time (known as a back-off interval) for accounting DIFS and avoiding interference with other communication stations. This may not ensure avoidance of collision of transmission signals but it minimizes the possibility of collision. This is known as collision avoidance (CA). In Ethernet of cable communications, a collision can be detected by the communication station. This is known as collision detection (CD). In the wireless communication system, the received signal is however offset by the transmitting output thus permitting no detection of the collision.

For detection of collision in a wireless communication system, the communication station at the receiving side transmits an acknowledgement in response to the arrival of packets transmitted by the transmitting station at the other side. This allows the transmitting station to have knowledge of the arrival of the packets at the receiving station. If no acknowledgement is received, the transmitting station determines a collision or transmission error has occurred and repeats the transmission of the packets.

What is explained above is known as carrier sense multiple access with collision avoidance (CSMA/CA), which is a type of accessing method for contention mode communication. This method is basically arranged so that plural communication stations compete with each other for occupancy of an available transmission channel. Hence, during the transmission of packets, discrepancies (jitters) may occur, and it will thus be impossible to predict the precise time of arrival of packets at the receiver station.

The technique of contention-free mode communications specified as an option in IEEE 802.11 will now be explained. The contention-free mode communication method is designed such that, during a particular period of time (the duration of contention-free mode communication) determined by the timing of transmission of a beacon from the control station, the contention mode communication between communication stations is canceled and the control station is operated to determine and give transmission priority to one of the communication stations through polling the communication stations. During this period, no collision of signals may consequently occur between the communication stations.

The contention-free mode communication method is suitable for transmission of data throughout a given duration, e.g. audio and video (AV) data, which are highly susceptible to jitters, and thus are particularly suited for broadcasting. While carrying out the subscriber registration procedure, the communication stations announce to the control station whether or not they use the contention-free mode.

Using information from the communication stations, the control station produces a list of the communication stations to be polled, namely a polling list. During the contention-free mode communication, the communication stations included in the list are polled one after another. For example, when communication station 2 intends to send a synchronous transmission to station 3, it transmits the synchronous transmission data packets, which are finally destined for station 3, to control station 1 upon being polled by control station 1.

The packets are held in control station 1 and transferred to station 3 by control station 1 together with its polling message at the time of polling of station 3. During the contention-free mode communication, each transmitting action is governed by control station 1 thus eliminating the collision of signals.

However, in the method of communication through a polling action of the control station during the contention-free mode operation, data which can be received directly by the destination station has to always be transferred via the control station. This decreases transmission efficiency to about ½ as compared with common direct transmission between two communication stations.

Also, in this method, the timing of starting the transmission depends largely on the size of data transmitted to another station at the preceding polling operation and the size of data to be transmitted in response to the current polling operation. If the timing is altered, jitters may accordingly occur even in this method.

Moreover, the synchronous transmission of bulky data such as AV data requires an extended length of time for connection to the transmission channel and occupies a large portion of the transmission signal band, resulting in shortage of the band range, particularly during transmission between plural communication stations.

In common wireless communications, two or more transmitting operations at one time may be permitted by adjusting the transmission power when the location of the stations, the number of obstructions, and the conditions for aerial transmission are not hostile. However, the contention-free mode communication method fails to address such simultaneous transmitting operations.

SUMMARY OF THE INVENTION

According to the method and apparatus of the present invention, a particular period involving no polling action, called time-slots, is assigned by the control station in the contention-free mode communication period. Throughout the particular period, synchronous communications can be performed directly between the communication stations. Prior to the direct communications, the communication station of interest conducts a call-connection procedure followed by a subscriber registration procedure for being under the control of the control station, and the communication station is then admitted by the control station for use of allotted time-slots.

A step of transmitting a test packet is added to the call-connection procedure, and the transmitting communication station examines whether or not it can communicate directly with the receiving station. When so, the two stations can communicate with each other without being relayed at the control station. The problem of contention-free mode communication, i.e., that the transmission rate decreases to ½ as compared with the direct transmission, can consequently be eliminated.

For allowing plural call-connections to be initiated at the same time-slot, the communication station includes:

(1) means for gaining data about the wireless signal reception state (such as quality), for example, the power level of the received wireless signal or the transmission error rate of the wireless signal;

(2) means for controlling the power level of signal transmission; and (3) means for, upon receiving a test packet or a test response packet, including in the test packet or the test response packet data describing the measured reception power level or the error rate of the previous packet received at the communication station.

The above arrangement permits the communication station to monitor the signal reception state at itself and at another communication station during transmitting and receiving the test packet and the test response packet before the communications. The communication station lowers the signal transmission power to such a level that the signal reception state stays above a threshold, thus minimizing the interruption of other communication stations with its transmitting signal. Consequently, the possibility for enabling synchronous communications between any two stations is significantly increased.

Alternatively, even when another communication station sets up another call-connection oriented in a different direction, it is more likely that the communication station can communicate with that destination station with the use of a directional antenna. This will further encourage simultaneous synchronous communications, in combination with wireless transmission level control.

However, using this method may cause another problem. When the communication station moves, it is unlikely that its signal transmission level and optimum antenna directivity control will be maintained. For compensation, the present invention provides a re-test procedure, in which the communication station transmits the test packet again. Any setting change triggered by movement of the communication station can consequently be detected and controlled dynamically to maintain optimum communication conditions.

If it is found from the re-test that relevant control parameters, such as the transmission level and the antenna directivity, are substantially identical to those measured in the original test, the conclusion is that the communication station has not moved but the communications have been interrupted by other causes. To deal with that, a packet requesting a change of time-slots is transmitted from the communication station to the control station. The control station controls the call-connection initiated in each time-slot with a call-connection table. The call-connection which cannot be performed among synchronous simultenous communications can be identified and shifted to another free time-slot by the control station, hence allowing the continuous operation of wireless communications.

BRIEF DESCRIPTION OF THE DRAWINGS

FIG. 12 illustrates a call-connection table structure;

DETAILED DESCRIPTION OF THE PREFERRED EMBODIMENTS

Figure 1:
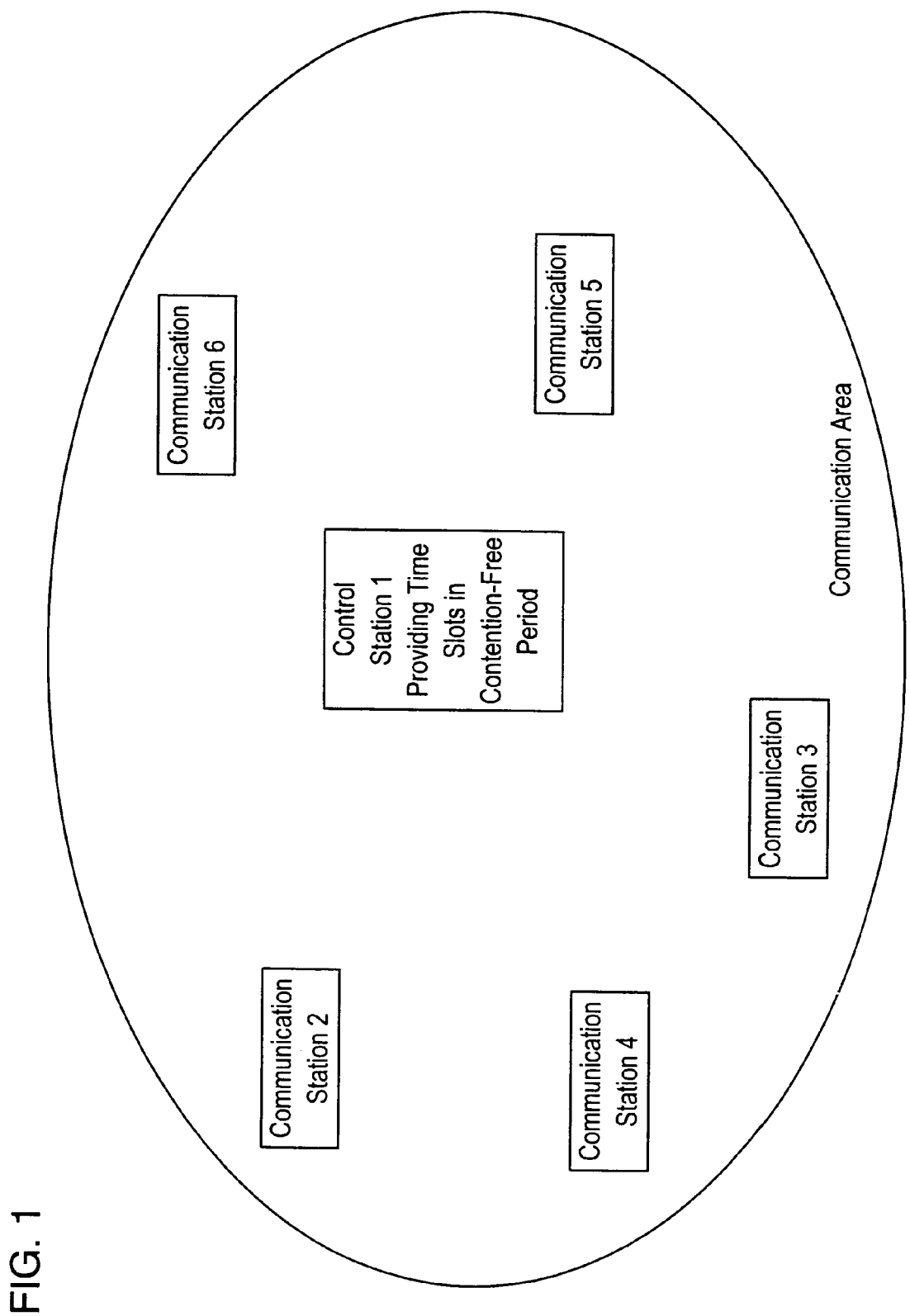
FIG. 1 illustrates an arrangement of a wireless network system according to an embodiment of the present invention.
Figure 7:
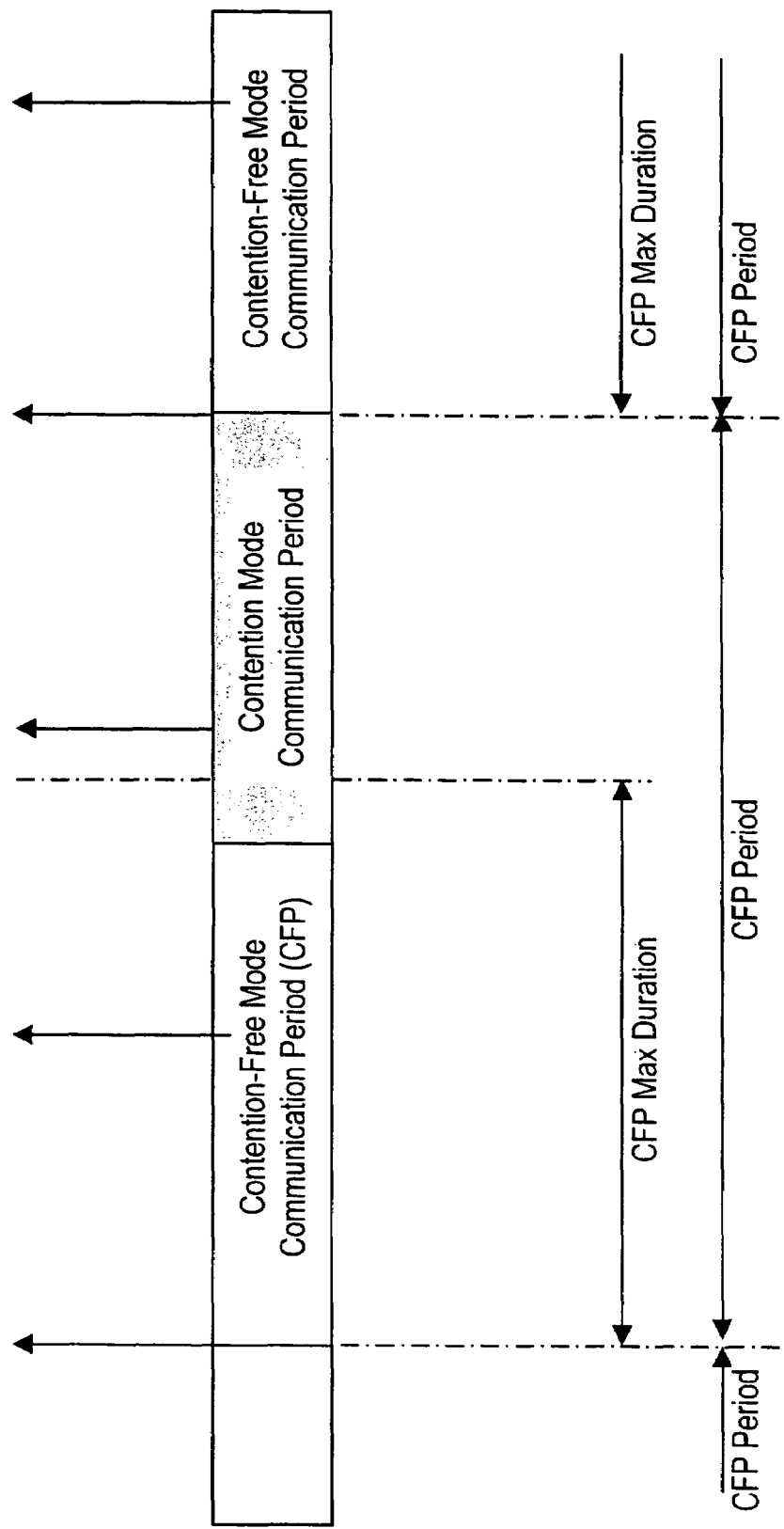
FIG. 7 illustrates a time sequence applied to a wireless network system according to the present invention.

FIG. 1 illustrates an arrangement of a wireless network system employing the present invention as discussed hereinbelow. FIG. 7 is a time sequence for the wireless network system used with the present invention. The time sequence is identical to that specified in IEEE 802.11, although variations of this sequence may be employed. As a series of beacons is transmitted at constant intervals of time from the control station, contention-free mode transmission, which continues during a contention-free period (CFP), is initiated. The Interval of the contention-free period (CFP) is determined by a set of contention-free (CF) parameters included in the beacons as a CFP period. The transmission is maintained in the contention-free mode throughout the maximum length of the contention-free period (CFP Max Duration), allowing the contention-free mode communications to be carried out by the communication stations as triggered by a polling operation of the control station. The contention-free period (CFP) may be shorter than the maximum length, depending on the number of the communication stations participating in the operation of contention-free mode communications.

Figure 2:
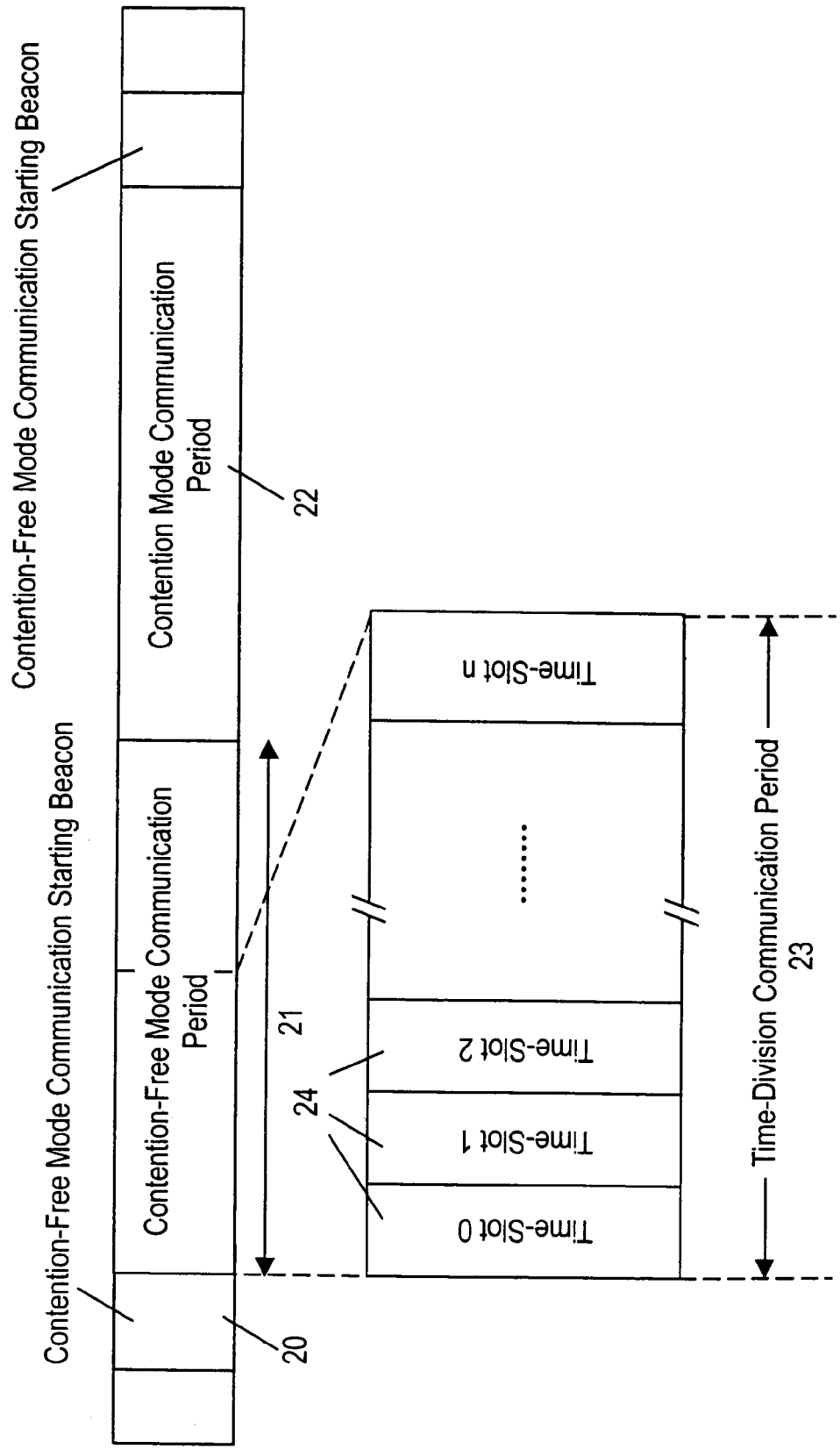
FIG. 2 illustrates a time frame structure used in the wireless network system according to the present invention.

FIG. 2 illustrates an example of a time frame of a wireless network system according to the present invention. The frame comprises:

(a) contention-free mode start beacon 20 at the leading end of the frame;

(b) contention-free mode communication period 21 during which there is no competition for transmission priority; and (c) contention mode communication period 22 during which transmission priority is competed for using a contention accessing method. Contention-free period 21 includes time-division communication period 23 which comprises a plurality of imaginary segments, called time-slots 24. Time-slots 24 are numbered to identify their address.

The length and the number of time-slots are fixed values predetermined by the control station and the communication stations. Alternatively, the fixed values of the length and the number of time slots may be determined by the control station and broadcast in the beacon signal to the communication stations.

As the beacon indicative of the start of the contention-free mode transmission is transmitted from the control station, the network system is shifted to contention-free mode communication period 21. Upon receiving the beacon, the communication stations set the network allocation vector (NAV) to a maximum value which indicates that the communication media is busy. Each communication station, while simultaneously judging that the communication media is busy, is allowed to start the transmission only when it receives a polling signal from the control station intended for that communication station.

However, only that communication station which has executed a call-connection procedure for requesting the use of time-slots and which is permitted to use the time-slots in a time-division transmission period can transmit data. For example, when communication station 2, illustrated in FIG. 1, is allotted two time-slots from time-slot 0, it can start transmitting data at the start of time-slot 0 and can continue up to the end of time slot 1.

The communication station to which time-slots are allotted, upon reaching the start of the allotted time-slots, transmits data using a common time division multiple access (TDMA) technique throughout the duration of the time-slots.

For two-way communication between any two stations during the time-division communication period, each station performs a call-connection procedure to gain time-slots for transmission and two-way communication can thus proceed. If the contention-free period is not terminated but continues after the time-division communication period, the rest of the contention-free period may be allotted to the other stations for transmission through a polling action of the control station.

For any station having no time-slots allotted thereto, the time-division communication period is equivalent to the contention-free period without being polled. Accordingly, the stations to which no time-slots are allotted are able to serve as conventional communication apparatuses during the contention-free period. After the contention-free period, the carrier sense multiple access with collision avoidance (CSMA/CA) method is used to obtain priority for transmission of data until another beacon indicative of starting the next contention-free period is received. The technique for obtaining priority of transmission in the contention mode communication period is not limited to CSMA/CA but may be another appropriate accessing method such as the Aloha method or the busy tone multiple access (BTMA) method.

Figure 3:
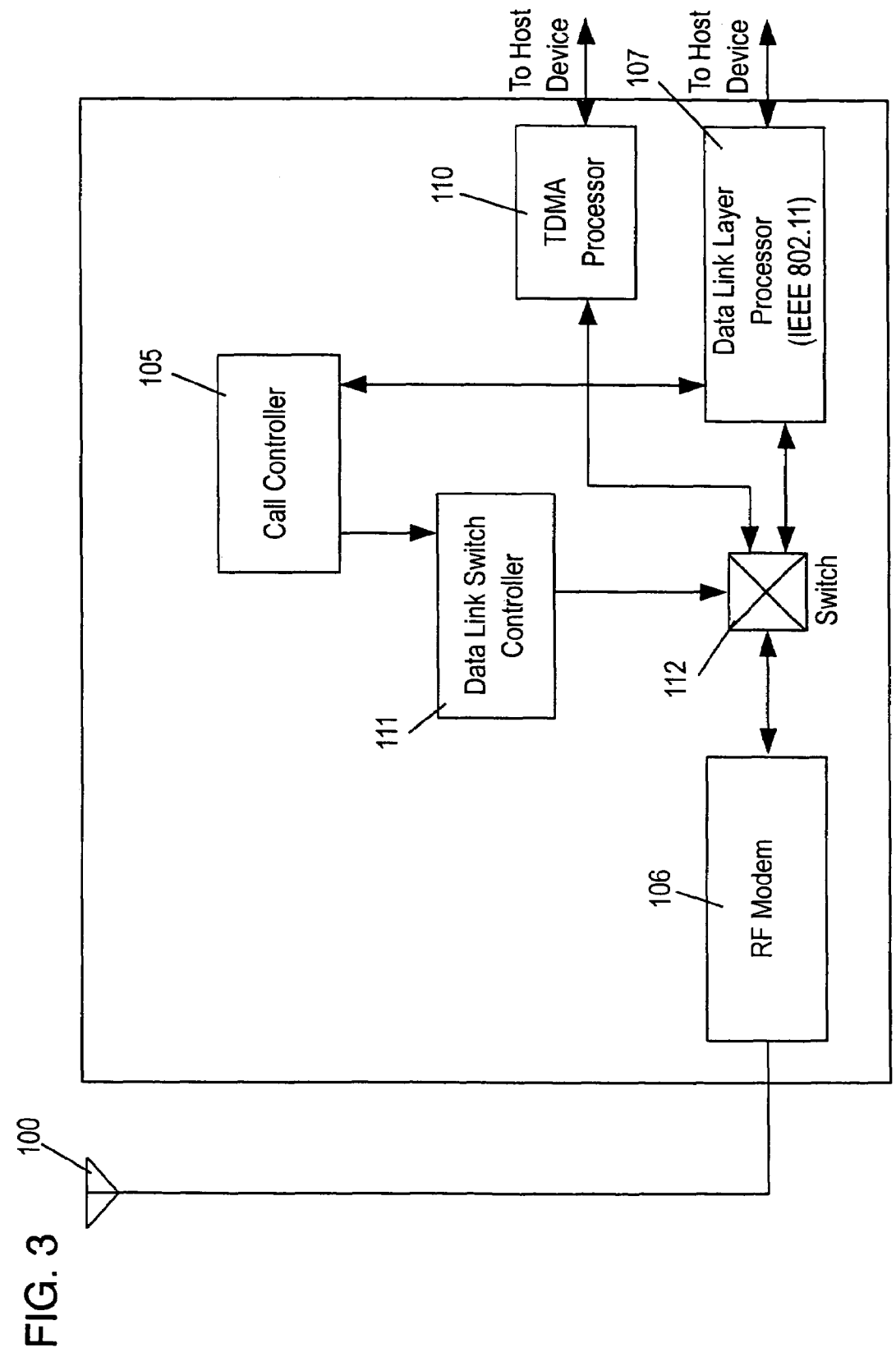
FIG. 3 illustrates a wireless apparatus used with the present invention.

FIG. 3 illustrates a basic arrangement of a wireless apparatus in a wireless network system according to the present invention. The wireless apparatus comprises:

(a) antenna 100;

(b) radio frequency (RF) modulator-demodulator (modem) 106;

(c) call controller 105 for controlling synchronous packet transmission;

(d) data link layer processor 107 for carrying out a data link processing operation conforming to IEEE 802.11;

(e) TDMA processor 110 for controlling accesses during a time-division communication period;

(f) data link switch controller 111 for switching data link layer processor 107 and TDMA processor 110; and (g) switch 112 driven by switch controller 111 for switching to a desired processor.

In data transmission, data to be transmitted is transferred from a host device to data link layer processor 107. When priority for data transmission is gained by data link layer processor 107, by executing the access procedure, the data are transferred to RF modem 106 where a physical layer header is added and the data are formatted as a packet and modulated before being transmitted from the antenna.

In data reception, data received by antenna 100 are transferred to RF modem 106 where the physical layer header is removed from the data and the packet is demodulated and fed to data link layer processor 107 where it is examined to determine if any error exists. When no error is found, processor 107 extracts NAV to examine whether or not the packet is addressed to the station. When so, the packet is unpacked and its data is transferred to the host device.

Figure 4:
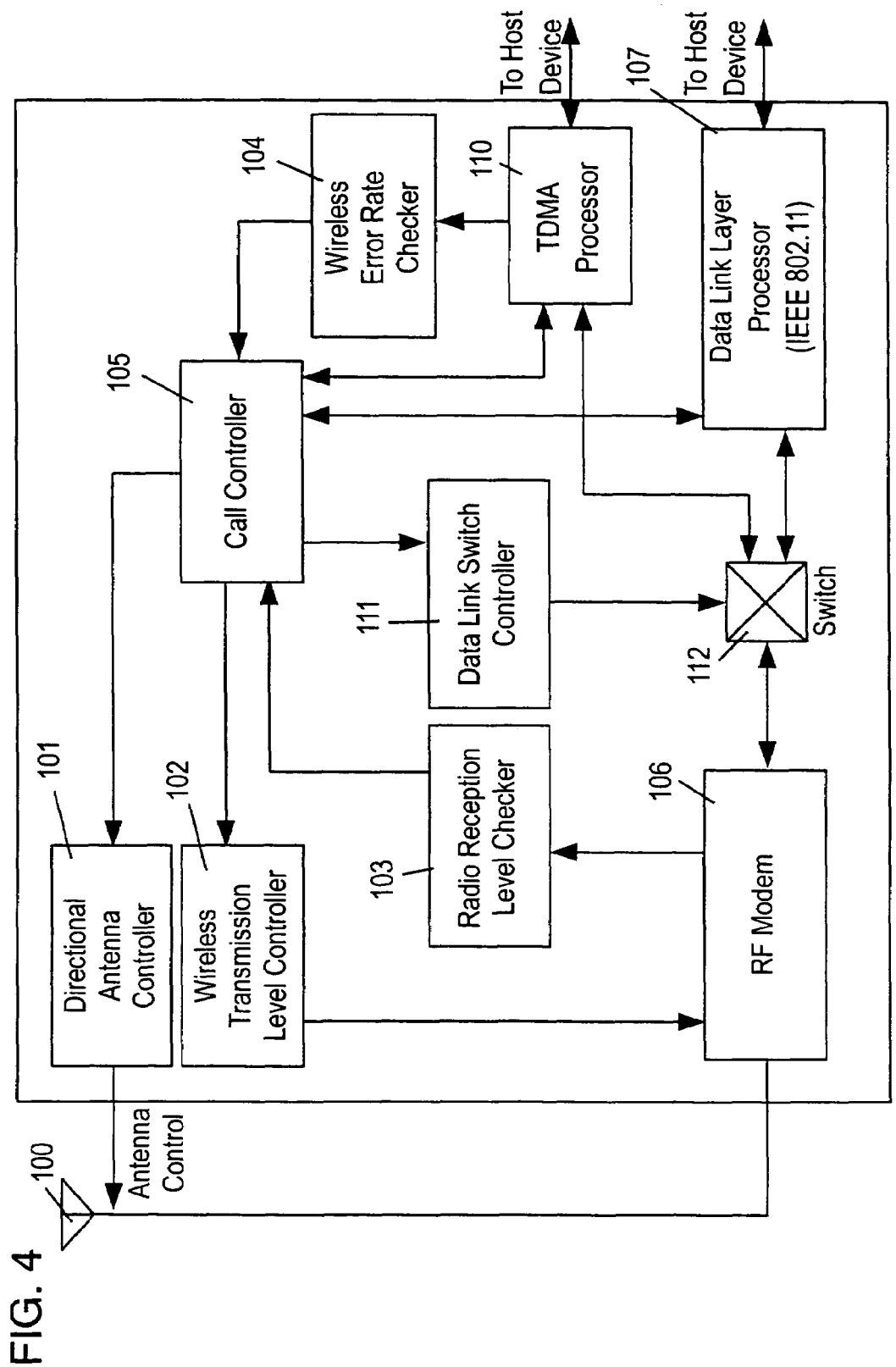
FIG. 4 illustrates an arrangement of a wireless apparatus equipped with a directional antenna controller.
Figure 5:
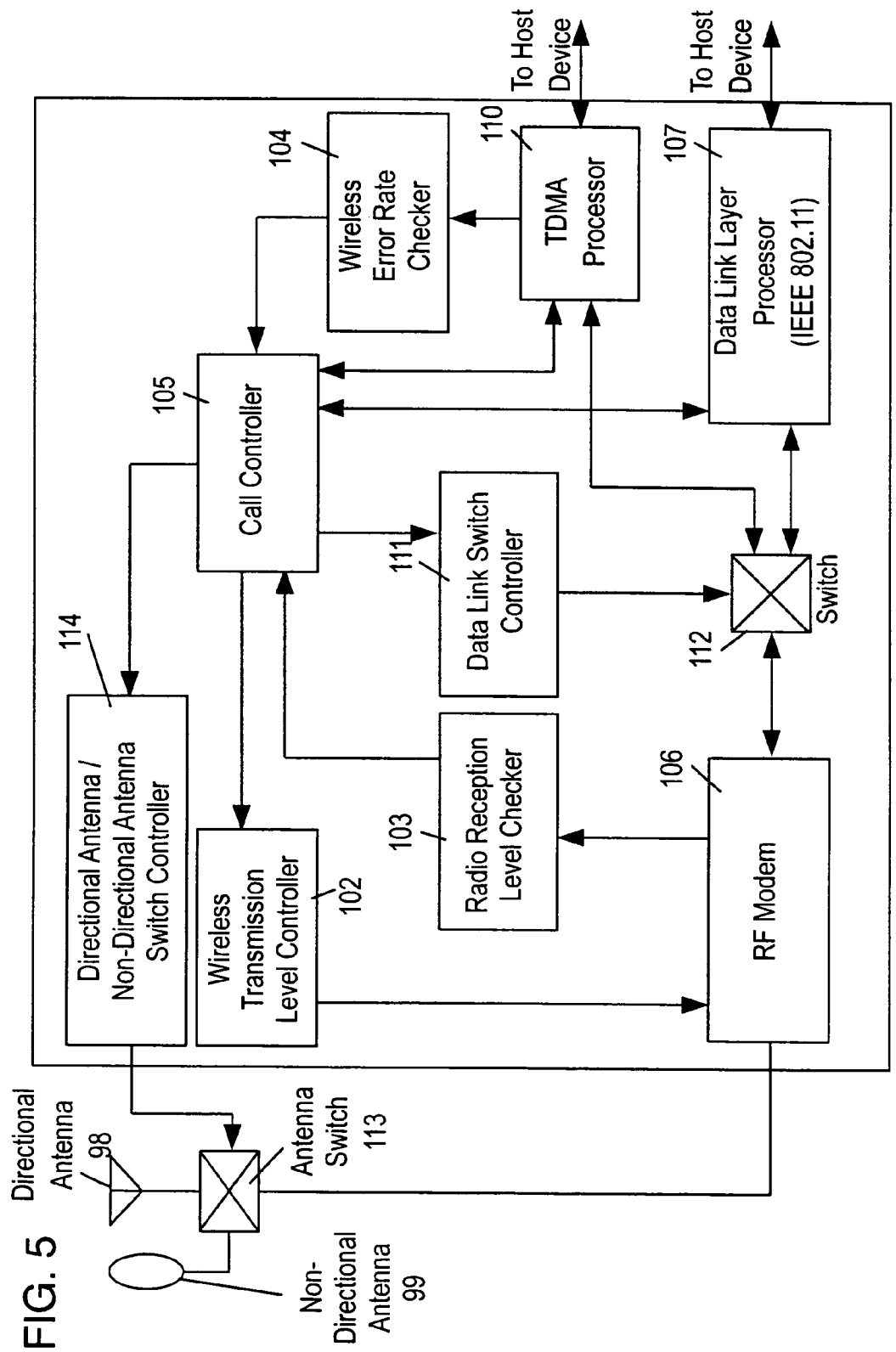
FIG. 5 illustrates an arrangement of a wireless apparatus equipped with a switching controller between a directional antenna and a non-directional antenna.
Figure 6:
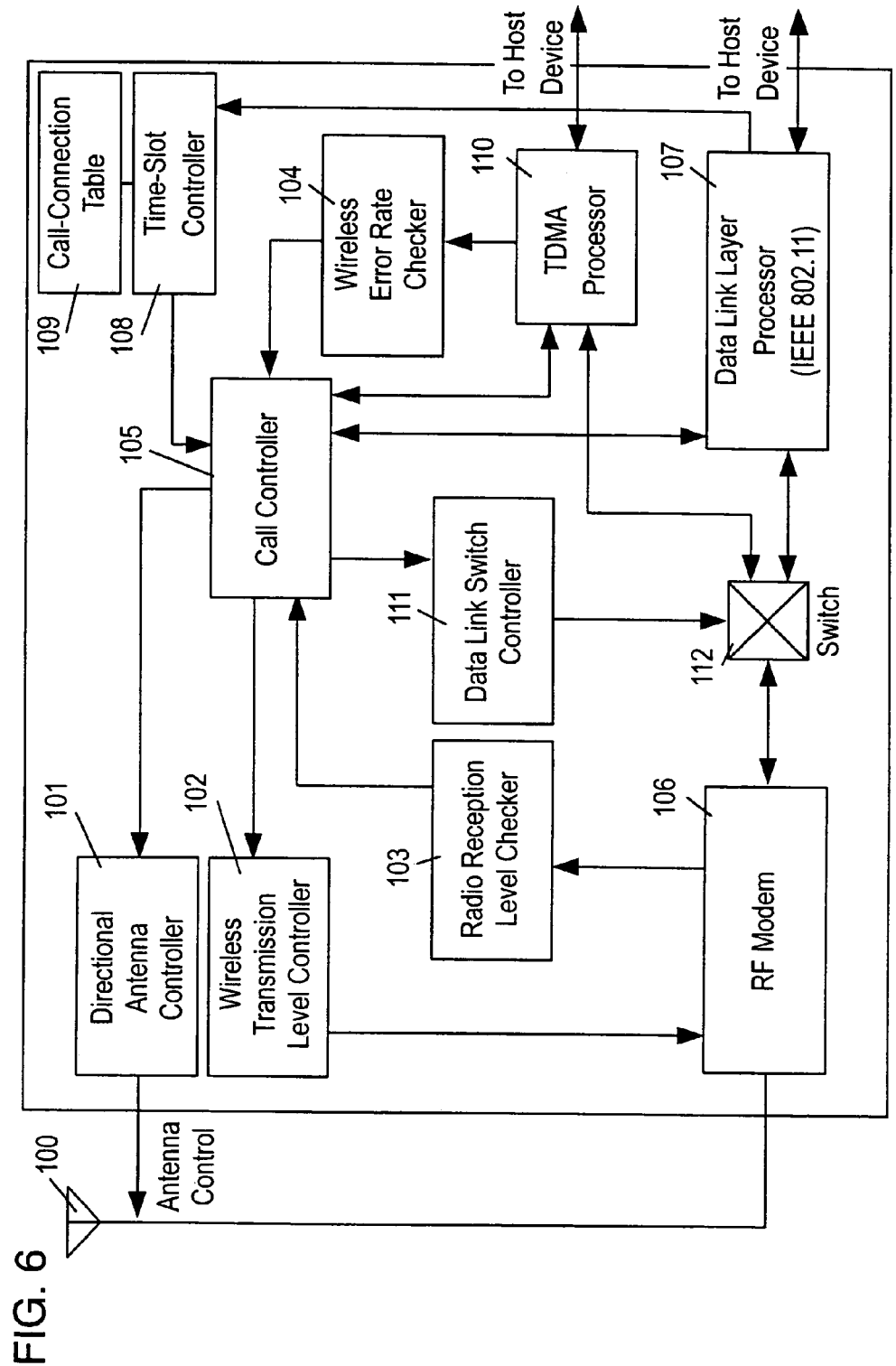
FIG. 6 illustrates an arrangement of a control station equipped with a directional antenna controller.
Figure 10:
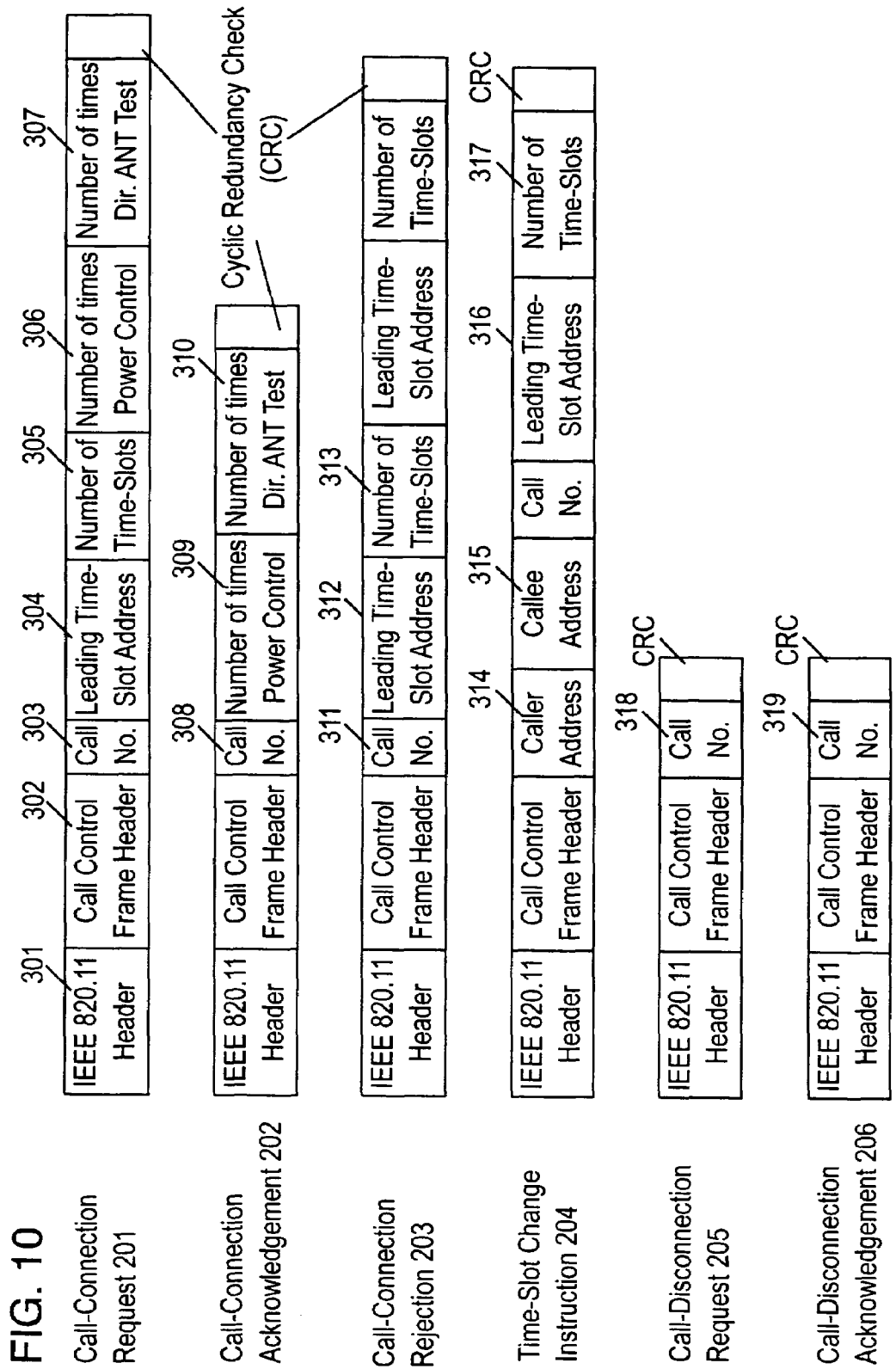
FIG. 10 illustrates examples of packet structures.
Figure 11:
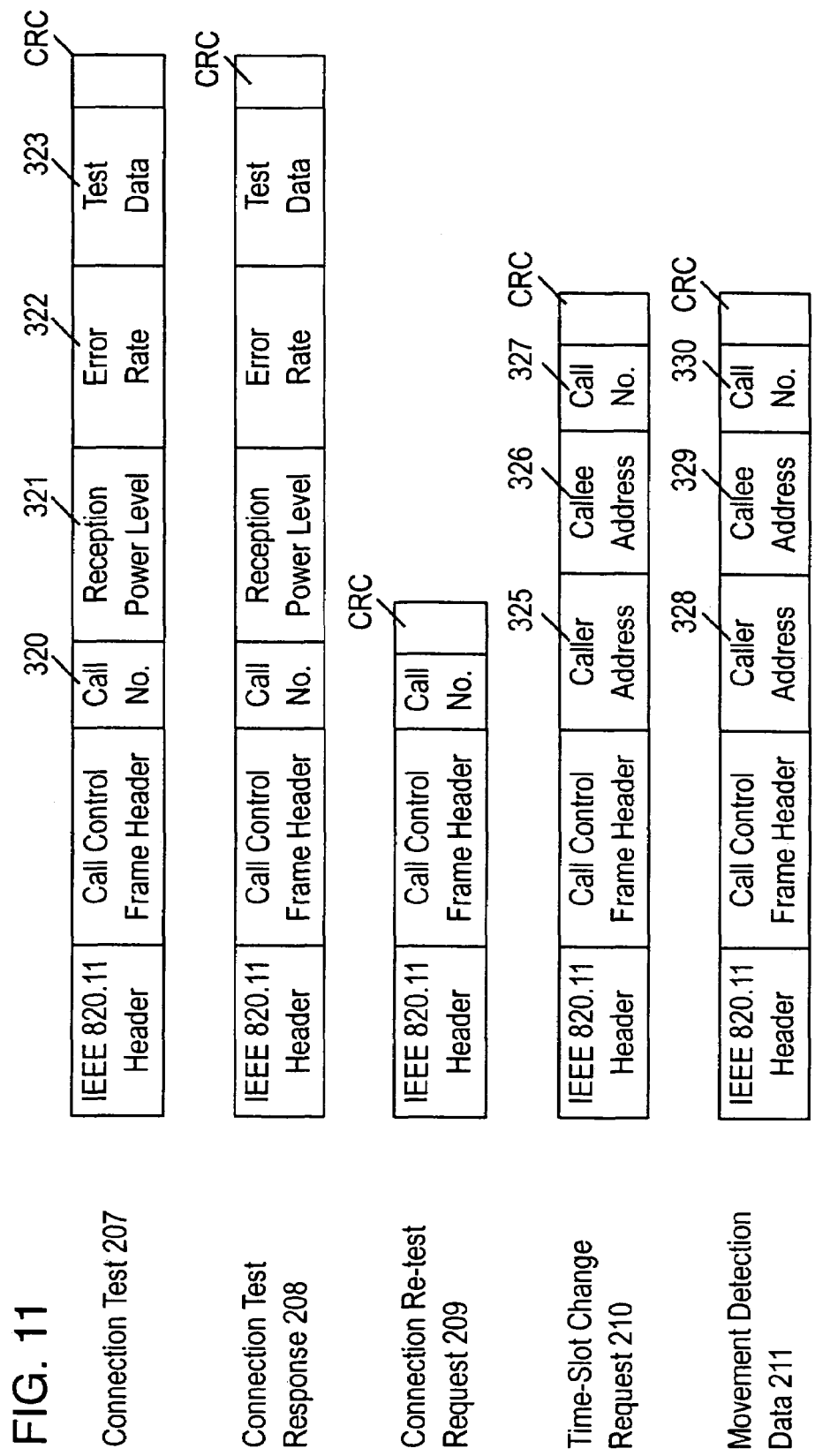
FIG. 11 illustrates further examples of packet structures.

Examples of packets for controlling a call-connection are shown in FIGS. 10 and 11. A cyclic redundancy check (CRC) is added at the end of each packet for checking for a burst error. When a group of packets for controlling a call-connection, including call-connection request packet 201, time-slot change instruction packet 204, and call-disconnection request packet 205, is received the packets are demodulated by RF modem 106 and examined by data link layer processor 107 for correctness. As illustrated in FIGS. 4, 5, and 6, the packets are then transferred by data link layer processor 107 to call controller 105. If it is desired to transmit call-connection acknowledgement packet 202, call connection rejection packet 203, call-disconnection request packet 205, or call-disconnection acknowledgement packet 206 from the wireless apparatus in response to the reception of the call-connection control packets, the received packets are passed from data link layer processor 107 to call controller 105. Call controller 105 generates and supplies response packets to data link layer processor 107.

After data link layer processor 107 repeats the access procedure conforming to IEEE 802.11 and obtains priority for data transmission, the response packets are transferred to RF modem 106 and then transmitted.

When synchronous packets to be transmitted are generated in the host device, their size is notified to call controller 105. Call controller 105 selects one of the transmission rates supported by RF modem 106 appropriate for transmission of synchronous packets and calculates the number of time-slots required for transmitting the size of the packet data at the selected rate. If the call-connection procedure has not been performed in advance, the transmission of the packets is inhibited during the contention-free period. The wireless apparatus or station can judge whether desired time-slots in its signal receivable area are occupied or not through monitoring packets from the control station and the other stations, i.e., the carrier is either present or not. According to the result of this examination, call controller 105 determines the address of the leading time-slot so that the transmission of the packets is completed within the time-division communication period.

Once the address of the leading end time-slot and the number of the time-slots have been determined, call-connection request packet 201 is then generated. According to the present invention, the wireless network illustrated in FIG. 1 is characterized in that:

(a) contention-free period starting beacon 20 is emitted once for every second;
(b) time-division transmission period 23 is 0.5 second;
(c) ten time-slots are available; and
(d) the maximum transmission rate is 24 Mbps.

When it is desired to transmit a group of packets at a rate of 5 megabits per second from communication station 2 in the network, five time-slots are needed. As illustrated in FIG. 10, station 2, when detecting the carrier at time-slot 2, generates call-connection request packet 201 with its leading time-slot address field 304 filled with 3 and its number of time-slots field 305 filled with 5.

As illustrated in FIG. 3, when the call-connection procedure for requesting the use of the time-division communication period has been completed, a detection signal for reception of contention-free period starting beacon 20 and a direction signal for the address of the leading time-slot and the number of time-slots determined through the call-connection procedure are transferred from call controller 105 to data link switch controller 111. Upon being informed by call controller 105 that contention-free period starting beacon 20 has been received, data link switch controller 111 starts counting time. While the duration of the time-slots allotted to the station is available, switch 112 is switched to TDMA processor 110 side from data link layer processor 107 side, for performing transmission and reception of data through TDMA processor 110.

When the allotted time-slots are timed up, switch 112 is returned back by data link layer switch controller 111 to data link layer processor 107 side. This allows the transmission and reception of data through data link layer processor 107.

FIG. 4 illustrates an arrangement of a communication station equipped with a directional antenna controller in the wireless network system according to the present invention. This station is equivalent to the wireless apparatus of FIG. 3 with the addition of directional antenna controller 101 for controlling the antenna directivity, wireless transmission level controller 102, wireless reception level checker 103, and wireless reception error rate checker 104. This wireless apparatus is identical to the wireless apparatus shown in FIG. 3 in its operations of transmitting and receiving common data packets and synchronous data packets as well as the call-connection request packet, the call-connection acknowledgement packet, the call-connection rejection packet, the time slots change instruction packet, the call-disconnection request packet, and the call disconnection acknowledgement packet for the call-connection.

In the apparatus illustrated in FIG. 4, for spatially isolating the communication stations linked by the call-connection from other stations, antenna directivity and transmission power are controlled using a group of packets shown in FIG. 11. When the call-connection procedure is completed, connection test packet 207 is generated by call controller 105. For transmitting packet 207, a signal for directing the transmission of the packet at a specific power level is generated and transferred from call controller 105 to wireless transmission level controller 102 which then controls the transmission power. Also, a signal for determining a specific pattern of the antenna directivity is transferred from call controller 105 to directional antenna controller 101 which then controls the antenna directivity. Connection test packet 207 is passed via data link layer processor 107 to RF modem 106 and transmitted from antenna 100 during the period of allotted time-slots.

Connection test packet 207 is then received by the station at the reception side where it is demodulated by RF modem 106 and transferred to wireless reception level checker 103 where its power level is measured. Connection test packet 207 is then transferred to data link layer processor 107 and wireless error rate checker 104 where its error rate is measured. These two measurements together with other information (a call control frame header and a call number) released from data link layer processor 107 are transferred to call controller 105 where they are used for generating connection test response packet 208.

Connection test response packet 208 generated by call controller 105 is transferred to data link layer processor 107 and RF modem 106 before being transmitted outside the time-division communication period through execution of a given accessing procedure.

Communication test response packet 208 is received by the station at the transmission side and its packet data is passed via data link layer processor 107 to call controller 105. The received power level and the error rate measured by the reception side station are extracted from packet 208 and recorded in call controller 105. During the period of the allotted time-slots, call controller 105 directs directional antenna controller 101 to determine an optimum pattern for the antenna directivity and directs wireless transmission level controller 102 to calculate an optimum level of the transmission power.

If communication conditions and quality decrease, e.g., the error rate in the received packet throughout the time-slots increases, connection re-test request packet 209 is generated by call controller 105 and transferred to data link layer processor 107 in the reception side station. The packet is transmitted via RF modem 106 outside the time-division communication period through repeating execution of the given accessing procedure.

In response to the communication re-test request packet, time-slot change request packet 210 or movement detection notice packet 211 illustrated in FIG. 11 is generated by call controller 105 and transferred to data link layer processor 107 in the transmission side station. This packet is then passed to RF modem 106 and transmitted outside the time-division communication period through executing the given accessing procedure.

FIG. 5 illustrates an arrangement of a communication station, similar to that shown in FIG. 4, where directional antenna controller 101 is replaced by a combination of directional/non-directional antenna switch controller 114 and antenna switch 113. The operation of these components is identical to that shown in FIG. 4. A signal indicating the reception of contention-free period starting beacon 20 is transferred from call controller 105 to directional/non-directional antenna switch controller 114 together with data about the time-slots start time and the number of time-slots.

Upon being informed by call controller 105 that contention-free period starting beacon 20 has been received, directional/non-directional antenna switch controller 114 starts counting the time. During the period of the allotted time-slots, antenna switch 113 is turned from the non-directional antenna side to the directional antenna side. During this period, the transmission and reception of wireless signals is carried out through the directional antenna.

When the allotted time-slots are timed up, the switching controller 114 shifts back the antenna switch 113 to the non-directional antenna side for enabling the transmission and reception of signals through the non-directional antenna. Antenna switch 113 is operated in synchronization with switch 112 controlled by data link switching processor 111.

FIG. 6 illustrates an arrangement of the control station in the wireless network system according to the present invention. The arrangement of the control station is basically identical to that of the communication station, except that time-slot controller 108 for controlling time-slots and call-connection table 109 are additionally provided. In the FIG. 6 embodiment, the control station is designed to receive all the packets transmitted within the wireless network system in order to control the call-connections, regardless of its involvement.

In the control station, the received packets are first processed by data link layer processor 107 where data about the call-connection control are picked up and transferred to time-slot controller 108. From this data, time-slot controller 108 extracts the address of a caller station, the address of a callee station, a calling number, the presence or absence of a time-slot change request, and the presence or absence of movement detection, which are then saved in call-connection table 109 for controlling the time-slot.

Time-slot controller 108 monitors the call-connection procedure through referring to call connection table 109 and examines whether an unqualified call-connection has been made. If an unqualified call-connection has been made, a signal directing generation of a time-slot change instruction packet is sent from time-slot controller 108 to call controller 105. In response, call controller 105 generates and delivers time-slot change instruction packet 204 to data link layer processor 107.

In data link layer processor 107, the accessing method conforming to IEEE 802.11 is executed prior to transmission of time-slot change instruction packet 204. When priority for transmission is given, packet 204 is passed to RF modem 106 and transmitted.

When the control station receives time-slot change request packet 210 from the caller station, its time-slot controller 108 supplies call controller 105 with the signal for directing generation of the time-slot change instruction packet to generate time-slot change instruction packet 204.

Whenever time-slot change request packet 210 is received, time-slot controller 108 accesses call-connection table 109 to determine which call-connection must be canceled and executes a proper procedure. This procedure will be described later in more detail.

Figure 8:
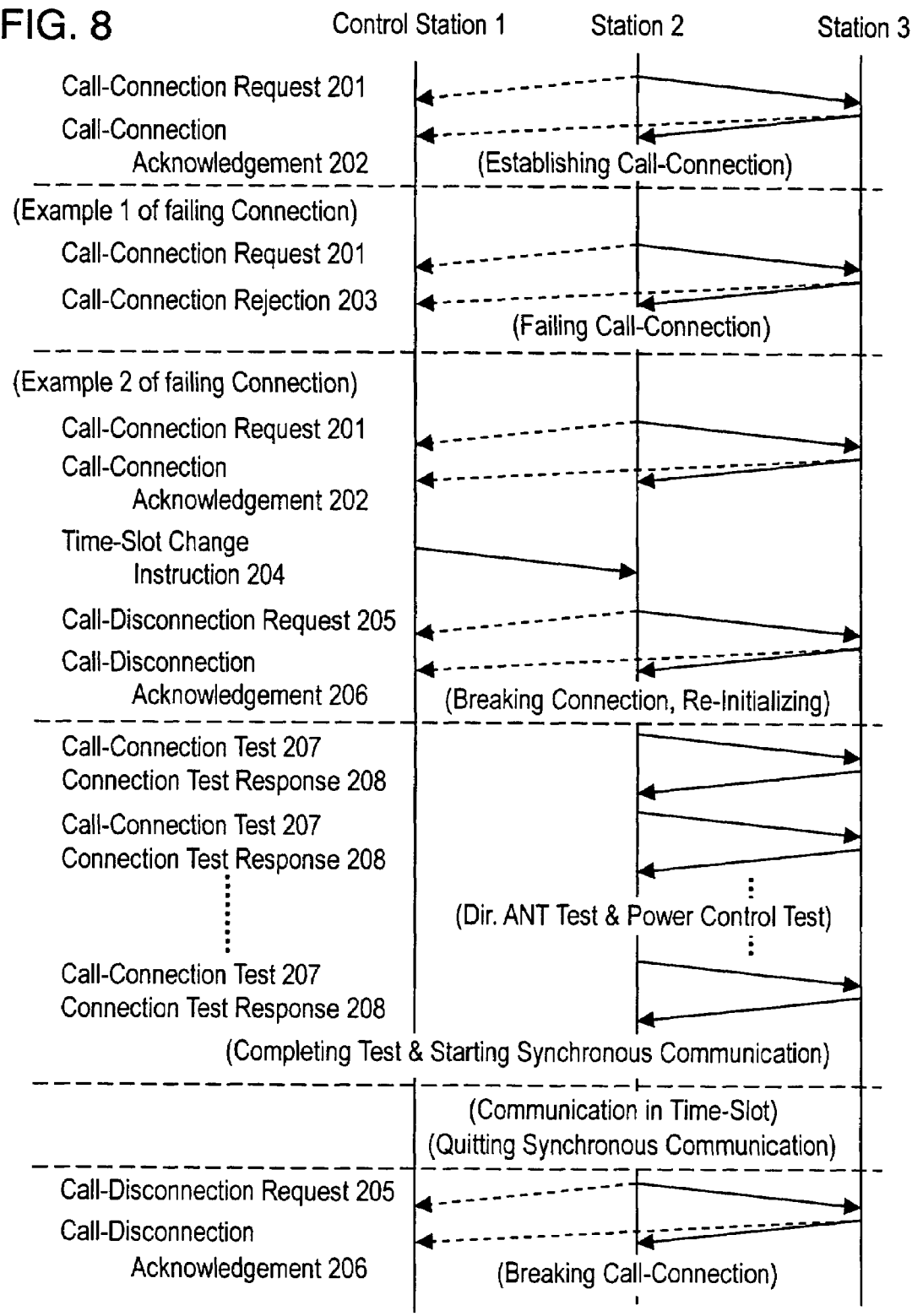
FIG. 8 illustrates a call-connection procedure according to the present invention.
Figure 9:
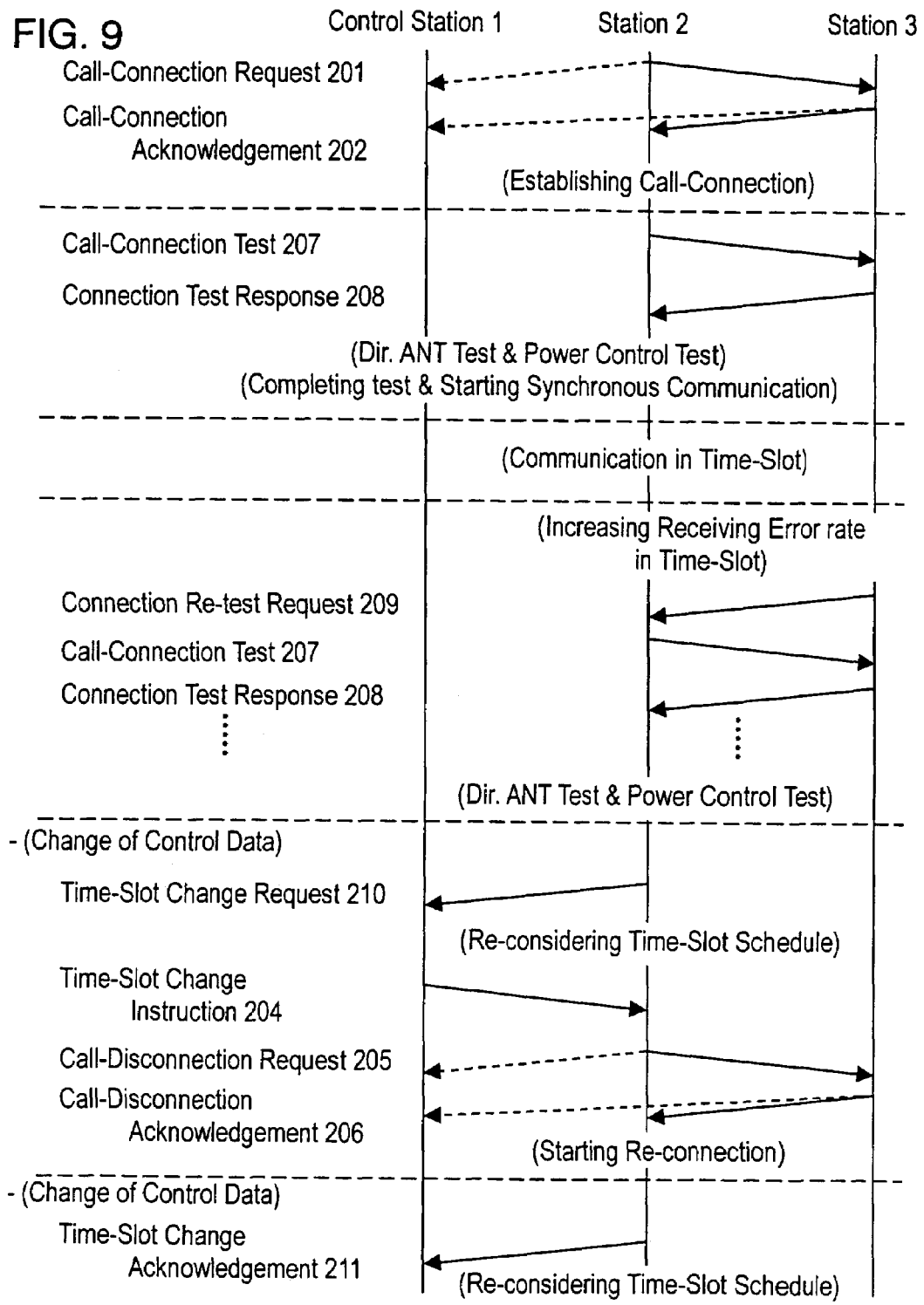
FIG. 9 illustrates a call-connection procedure according to the present invention.

The communication station, after executing the subscriber registration procedure with the control station, performs the call-connection procedure as illustrated in FIGS. 8 and 9. Packets required for the call-connection are illustrated in FIGS. 10 and 11. Each packet is includes:

(1) IEEE 802.11 header 301; and (2) call control frame header 302 indicating whether or not the packet is for a call-connection procedure control and the type of call-connection control. The remaining area of the packet following frame header 302 is pertinent to the packet type.

IEEE 802.11 header 301 contains the addresses of the packet transmitting station and the address of the packet receiving station. If necessary, these data can readily be read out from header 301.

The call-connection procedure will now be explained referring to FIGS. 8 and 9.

For example, communication station 2 intends to have synchronous communication with communication station 3. Communication station 2 sends call-connection request packet 201 to communication station 3. Call connection request packet 201 includes the address of station 3 as the target station, call number 303 as its identification sign, leading time-slot address 304 to be occupied, number of time-slots to be occupied 305, number of times for repeating the power control test packet 306, and number of times for repeating the directional antenna test packet 307, in the form of parameters.

When leading time-slot address 304 and number of time-slots 305 are accepted, communication station 3 sends back call-connection acknowledgement packet 202 filled with the address of transmitting station 2, call number 308 identical to that of the call-connection request, number of times for repeating the power control test packet 309, and number of times for repeating the directional antenna test packet 310.

In the response packet, number of times for repeating the power control test packet 309 and number of times for repeating the directional antenna test packet 310 contain values greater than those of number of times for repeating the power control test packet 306 and number of times for repeating the directional antenna test packet 307 in the request packet respectively. Those values are the number of test operations required for favorably carrying out wireless transmission control and directional antenna control for the station.

In the case that leading time-slot address 304 and number of time-slot 305 requested by communication station 2 are unacceptable, communication station 3 then transmits call-connection rejection packet 203. Rejection packet 203 includes call number 311 as well as address of the leading time-slot 31, and the number of time-slots being used by station 3. If desired, communication station 2 may repeat sending call-connection request packet 201 filled with another requested set of time-slots determined by reviewing the data in rejection packet 203.

Meanwhile, control station 1 is constantly monitoring call-connection request packet 201 and call-connection acknowledgement packet 202. Control station 1 holds the address of station 2, the address of station 3, the leading time-slot address, and the number of time-slots in the call-connection table as shown in FIG. 12.

If any unqualified call is made, i.e., which occupies time-slots outside the specifications, control station 1 delivers time-slot change instruction packet 204 to communication station 2. Time-slot change instruction packet 204 contains caller address 314, callee address 315, leading time-slot address 316 to be changed, and number of time-slots 317 to be changed.

If control station 1 intends to reject the call-connection due to, e.g., having no adequate resource, control station 1 transmits time-slot change instruction packet 204 including number of time-slots 317 filled with 0. Upon receiving packet 204, communication station 2 transmits call-disconnection request packet 205 including call number 318. In response, communication station 3 cancels the call-connection by transmitting call-disconnection acknowledgement packet 206 including call number 319 filled with the same parameter as those of call number 318. If desired, communication station 2 can repeat the call-connection procedure.

When receiving the call-connection acknowledgement packet, communication station 2 judges that the call-connection to station 3 is accepted until control station 1 transmits time-slot change instruction packet 204. Then, communication station 2 repeats the transmission of connection test packet 207 a number of times determined by the number of times for repeating the directional antenna test packet 310 and then a number of times determined by the number of times for repeating the power control test packet 309. Test packet 207 has test data 323 filled with a series of bits which are predetermined for the test. The bit error rate may be found from demodulation of these bits.

Upon receiving test packet 207 from communication station 2, communication station 3 transmits connection test response packet 208. Test response packet 208 contains reception level 321 which represents the reception state when test packet 207 is received, error rate 322, and call number 320. When communication station 2 has received test response packet 208 from communication station 3 and finds that the test has not been completed for the determined number of times, it transmits test packet 207 including error rate 322 and reception level 321 indicating the reception state when packet 208 was received. Test data 322 at the time contains the series of bits predetermined for the test.

As test packet 207 or test response packet 208 is received, the antenna directivity is modified by the station so that the reception level is maximized and the error rate is minimized during the antenna test period. The station also monitors the reception state of the test packet or the test response packet during the power test period and minimizes the transmission level to such a level that the reception state stays at or above its threshold.

During the given test period, the station confirms the control data for the directional antenna and the control data for the wireless transmission level. In the actual transmission and reception of data, both the antenna directivity and the transmission level can be controlled according to those control data.

There is possibly a case in which it is difficult for control station 1 or any other station to monitor or interrupt the transmission and reception of the test packet and the test response packet between the communication stations.

Also, another case is that while signals from communication station 2 can be received, signals from communication station 3 cannot be received. In this case, it is impossible to determine whether or not the error rate or the reception level in the test packet has been interrupted by interference signals from any other station than communication stations 2 and 3.

For compensation, an initialization procedure, such as request to send (RTS) and clear to send (CTS) messages conforming to IEEE 802.11, is proposed. In this procedure, the communication station previously announces its intention to use the transmission channel for the test period by sending the RTS and CTS messages. This permits the two involved stations to carry out an exchange of test packets without being interrupted by any other station, hence obtaining correct control data.

The communication station uses at least one of wireless reception level checker 103 and wireless error rate checker 104 for inspecting the state of transmission or reception during the period of allotted time-slots.

In case that the state of transmission or reception during the time-slots decreases, the possible cause may be:

(a) that any of the two stations moved after establishing the call-connection; or (b) that another call-connection was made and starts transmitting a signal in the same period of time-slots thus interrupting the current call-connection.

The procedure according to the present invention for diagnosing the decrease in the state of transmission or reception is as follows. Assuming the decrease is due to cause (a) discussed above, the communication station repeats the examination with the test packet. If the control data remains unchanged, it is then judged that the decrease is due to cause (b) discussed above, and time-slot change request packet 210 is transmitted.

It is now assumed that either the caller station or the callee station is disabled with the state of transmission or reception decreased below the threshold. The examination is then started by transmitting connection test packet 207 from the caller station or transmitting connection re-test request packet 209 from the callee station.

FIG. 9 illustrates an example of callee station 3 transmitting the re-test request. The number of times for repeating the examination of the antenna directivity and the power level is equal to the value of that parameter transmitted in the packet when the call-connection is requested. If the control data for the antenna directivity and the power level remain unchanged after the repeated examination, caller station 2 transmits time-slot change request packet 210 including caller address 325, callee address 326, and call number 327 to control station 1.

When the state of reception is changed, movement detection notice packet 211 including caller address 328, callee address 329, and call number 330 are sent to control station 1.

The action of control station 1 when receiving time-slot change request packet 210 and movement detection notice packet 211 will now be explained.

Control station 1 accesses call-connection table 109 to pick up a group of call-connection during the period of time-slots determined by the call number saved in request packet 210 or notice packet 211 and stands by throughout one CFP period. When only time-slot change request packet 210 is received but not movement detection notice packet 211 during the stand-by time, the request is admitted. Control station 1 then retrieves a set of time-slots not occupied by any call-connection and transmits time-slot change instruction packet 204 indicating the retrieved time-slots.

When time-slot change request packet 210 is received and, in one CFP period, movement detection notice packet 211 is received from the station which makes a call-connection in the same time-slots, control station 1 stands by for another one CFP period. When control station 1 again receives the time-slot change request packet, station 1 prepares and allots another set of unoccupied time-slots to the call-connection.

FIG. 12 illustrates an arrangement of call-connection table 109. Call-connection table 109 includes time-slot data indicating the time-slots in use, a caller address, a callee address, a call number, reception of the time-slots change request packet, and reception of the movement detection notice packet.

The time-slot data, the caller address, and the callee address are retrieved and saved by control station 1 by monitoring the call-connection procedure conducted by the communication stations. The presence of time-slot change request packet 210 and the presence of movement detection notice packet 211 are maintained throughout one CFP period after their reception.

Data indicating the presence of those packets are reset at the reception of a beacon indicating the start of the CFP period. It is essential that the transmission of time-slot change direction packet 204 in response to time-slot change request packet 210 is executed before the transmission of the beacon at the time when the CFP period starts.

Call-connection table 109 shown in FIG. 12 has time-slot 1 of call number 409 for data transmission from station 3 to station 5 accompanied with the time-slot change request. If control station 1 fails to receive the movement detection notice packet in the call-connection request of call number 1001 from station 2 to station 4, the call-connection request of call number 409 has to be shifted to another time-slot. As the time-slots 0 and 2 are occupied with two qualified call connections respectively, time-slot 3 is allotted to station 5 by control station 1.

This embodiment may employ a call-connection procedure for a synchronous packet transmitting station using a call-connection request packet filled with data about the time-slot address and the number of time-slots. This embodiment may employ an alternative call-connection procedure where the synchronous packet transmitting station supplies the control station with data about the destination station and the size of information to be transmitted, allowing the control station to determine a set of time-slots allotted.

Figure 13:
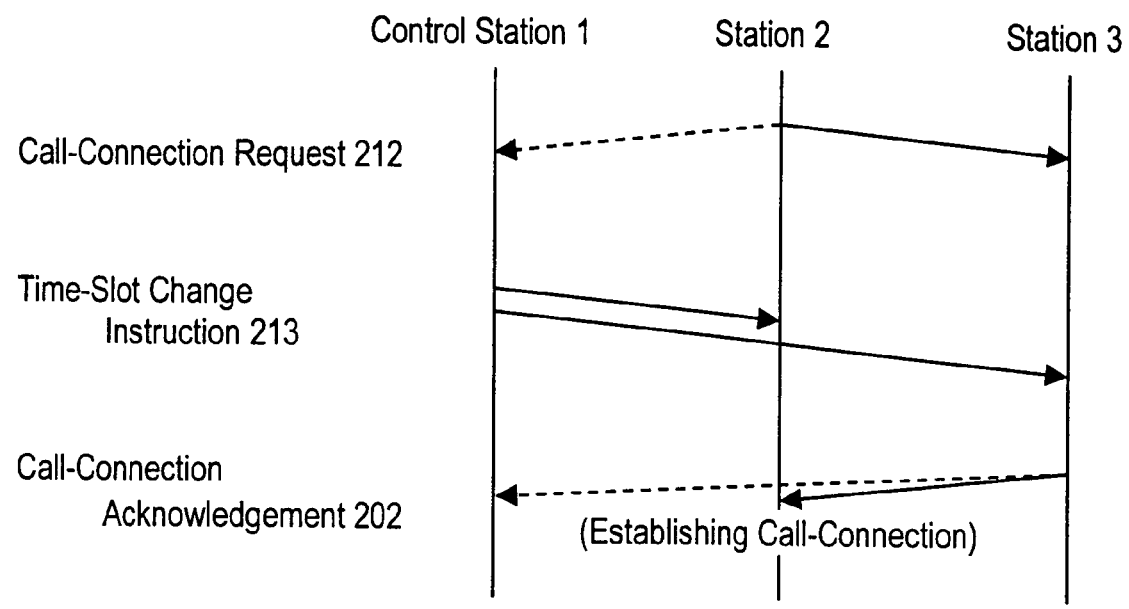
FIG. 13 illustrates a synchronous transmission procedure from a call-connection request to allotting of time-slots.
Figure 14:
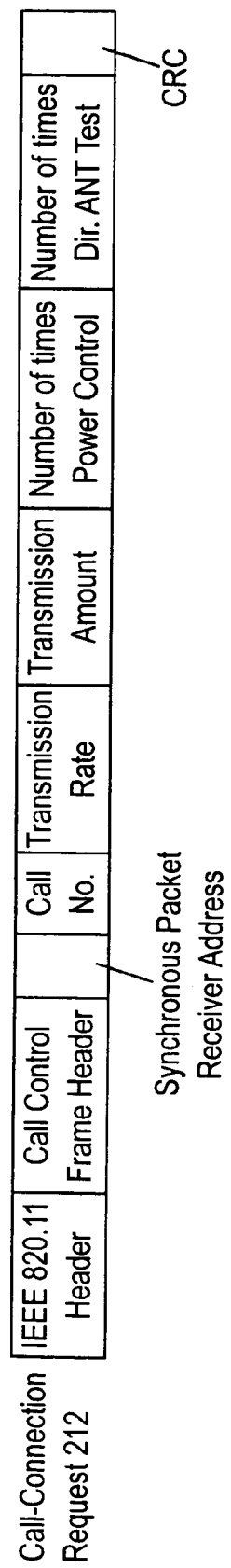
FIG. 14 is an example of packet structure.
Figure 15:
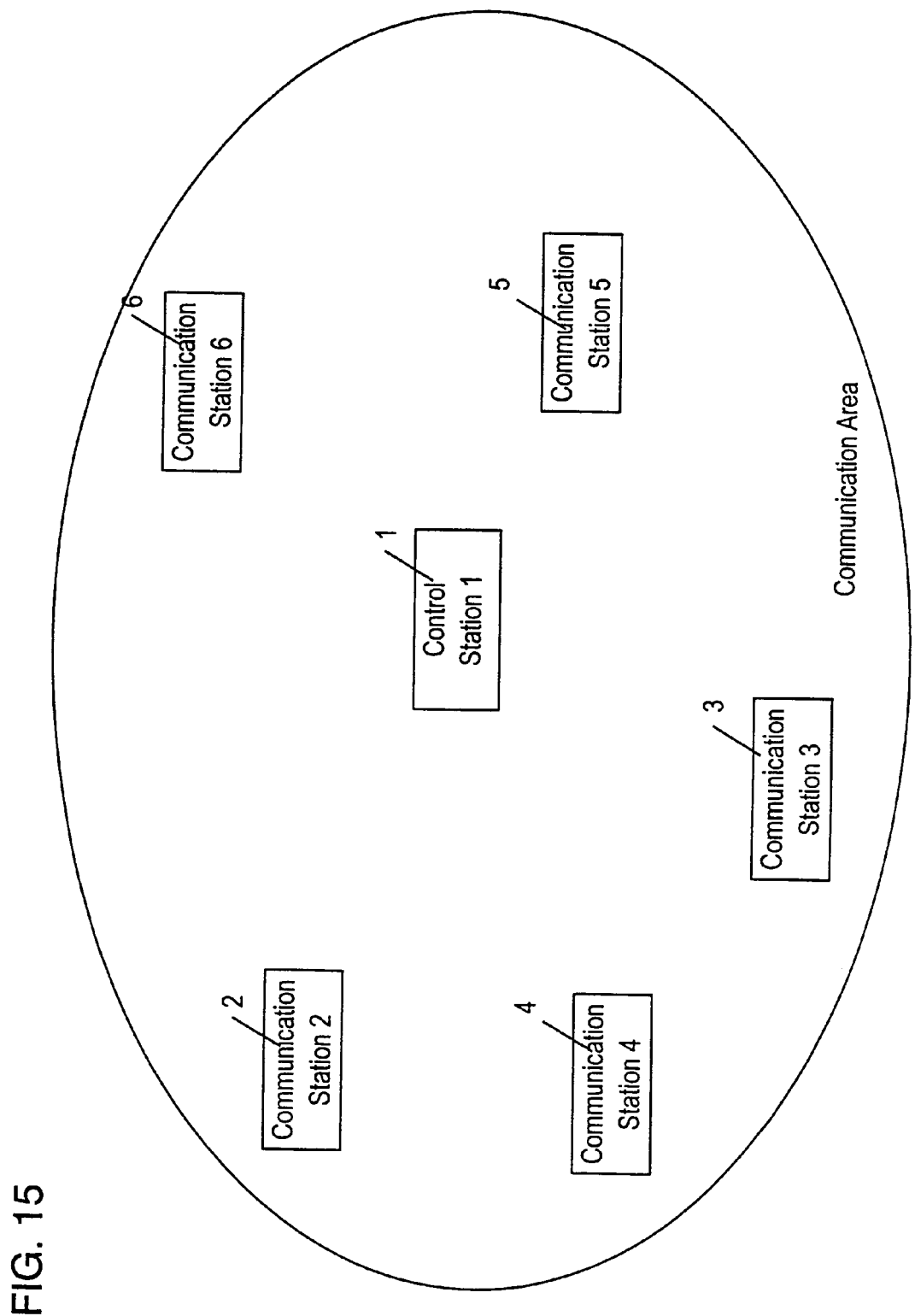
FIG. 15 shows an arrangement of a wireless network system to illustrate the prior art.

FIG. 13 illustrates a procedure from call-connection request to assignment of time-slots for synchronous transmission from communication station 2 to communication station 3. FIG. 14 illustrates an example of a call-connection request packet. Call connection request packet 212 is filled with the address of a synchronous packet receiver station, the amount of data to be transmitted, and the transmission rate released from communication station 2 to control station 1.

Control station 1 calculates the number of time-slots to be allotted from various information included in call-connection request packet 212. Then, control station 1 retrieves a set of time-slots from call-connection table 109 and allots them to communication station 3 using time slot change instruction packet 204. Time-slot change direction packet 204 from control station 1 may also be received by communication station 2. When finding that the allotted time-slots are unfavorable for reception of data from station 2, communication station 3 transmits call-connection rejection packet 203 to station 2. When favorable, communication station 3 sends call-connection acknowledgement packet 202 to communication station 2. When call-connection acknowledgement packet 202 from communication station 3 is received by communication station 2, the call-connection procedure is completed and station 2 is thus allowed to use the allotted time-slots. Then, the transmission and reception of the test packets follows as described previously.

Although the present invention has been fully described by way of examples with reference to the accompanying drawings, it should be understood that numerous variations, modifications and substitutions, as well as rearrangements and combinations, of the preceding embodiments will be apparent to those skilled in the art without departing from the novel spirit and scope of this invention.

What is claimed is:

1. A communication method in a wireless network system using both a contention mode communication period and a contention-free mode communication period as a communication protocol between communication stations controlled by a control station, said communication method comprising the steps of:
   (a) providing time-slots in the contention-free mode communications period;
   (b) employing one of the communication stations to establish a call-connection between itself and another one of the communication stations through executing a procedure of call-connection with said control station in order to communicate in the time-slots; and
   (c) when the control station acknowledges that the call-connection is established, performing a packet communication operation involving transmitting packets between said one of said communication stations and said another one of said communication stations in the time-slots while bypassing said control station.

2. The communication method according to claim 1, further comprising the steps of:
   (d) employing the control station to transmit a time-slot change instruction packet for directing change of a first time-slot where a first communication station of said communication stations establishes a call-connection to the first communication station; and
   (e) employing the first communication station when receiving the time-slot change instruction packet to change the first time-slot according to information in the time-slot change instruction packet.

3. The communication method according to claim 2, further comprising the steps of:
   (f) employing the control station to produce a call-connection table through monitoring the procedure of call-connection;
   (g) employing the first communication station to transmit a time-slot change request packet to the control station for requesting change of the first-time slot;
   (h) employing the control station when receiving the time-slot change request packet to access the call-connection table;
   (i) employing the control station to examine from accessed information in the call-connection table whether or not a first call-connection requested by the first communication station is admitted for establishment;
   (j) employing the control station when judging that the first call-connection is not admitted for establishment to transmit the time-slot change instruction packet to the first communication station; and
   (k) employing the first communication station when receiving the time-slot change instruction packet to change the first time-slot.

4. The communication method according to claim 2, wherein said step (b) comprises the sub-steps of:
   (i) employing the communication station to transmit a test packet; and
   (ii) employing the communication station to adjust transmission quality of the call-connection according to information in the test packet with an adjusting method.

5. The communication method according to claim 1, wherein said step (b) comprises the sub-steps of:
   (i) employing the communication station to transmit a test packet; and
   (ii) employing the communication station to adjust transmission quality of the call-connection according to information in the test packet with an adjusting method.

6. The communication method according to claim 5, wherein said step (b) comprises the sub-steps of:
   (i) employing the communication station to transmit a test packet; and
   (ii) employing the communication station to adjust transmission quality of the call-connection according to information in the test packet with an adjusting method.

7. The communication method according to claim 6, further comprising the steps of:
   (l) employing one of said communication stations which receives the test packet to transmit a test response packet;
   (m) applying a signal reception state data section to each of the test packet and the test response packet;
   (n) employing said one of the communication stations to save data about signal reception state of the test packet and the test response packet respectively in the signal reception state data section; and (o) employing the communication stations to adjust transmission quality according to the data about the signal reception state.

8. The communication method according to claim 7, wherein said step (n) comprises the sub-steps of:
(i) measuring at least one of an error rate in the wireless signal reception and a level of the wireless signal reception; and
(ii) saving a resultant measurement as the data about the signal reception state in the signal reception state data section.

9. The communication method according to claim 7, wherein said step (o) comprises the sub-step of:
lowering wireless transmission power of the test packet to such a level that the data about the signal reception state stays above a threshold.

10. A communications method according to claim 7, wherein said step (o) comprises the sub-steps of:
(i) estimating a direction of signals from the data about the signal reception state when the test packet or the test response packet is received; and
(ii) controlling antenna directivity to correspond to the direction.

11. The communication method according to claim 10, wherein the antenna directivity is controlled with an adaptive array antenna.

12. The communication method according to claim 10, wherein the antenna directivity is controlled by switching between a non-directional antenna and a directional antenna.

13. The communication method according to claim 7, further comprising the step of:
employing the one of the communication stations to perform a communication at the adjusted transmission quality in the time-slots.

14. The communication method according to claim 6, further comprising the steps of:
(n) when receiving no acknowledgment of reception of packet transmitted, employing an adjusting method comprising causing the communication station to transmit the test packet in the contention mode communication period;
(o) when the adjusting method of step (n) is employed, employing the communication station to transmit a time-slot change request packet to the control station; and
(p) when an adjusting method is employed which is different from the adjusting method of step (n), employing the communication station to adjust the transmission quality with another adjusting method.

15. A communication method in a wireless network system using both a contention mode communication period and a contention-free mode communication period as a communication protocol between communication stations controlled by a control station, said communication method comprising the steps of:
(a) providing time-slots in the contention-free mode communication period;
(b) employing one of said communication stations to requesting a call-connection by requesting allotment of a number of time slots and a leading time-slot address identified by a first time-slot by a communication station through execution of a call-connection procedure with the control station; and
(c) when said control station acknowledges that a call-connection has been established, employing said one of said communication stations to perform a packet communication operation with another one of said communication stations in the time-slots beginning with the leading time-slot while bypassing said control station.

16. The communication method according to claims 13, 14 or 15, wherein said step (b) further comprises the sub-steps of:
(i) employing one of said communication stations to transmit a test packet; and
(ii) employing one of said communication stations to adjust a transmission quality of a call-connection according to information received in said test packet.

17. The communication method according to claim 16, further comprising the steps of:
(l) employing one of said communication stations to transmit a test response packet in response to receipt of said test packet;
(m) providing a signal reception quality data section in each of the test packet and the test response packet;
(n) employing one of said communication stations to save data about signal reception quality of the test packet and the test response packet in the signal reception quality data section; and
(o) employing one of said communication stations and said control station to adjust transmission quality based on the saved data about signal reception quality.

18. The communication method according to claim 17, wherein said step (n) further comprises the sub-steps of:
(i) measuring the quality of a received signal as at least one of an error rate in the wireless signal reception and a level of the wireless signal reception; and
(ii) saving the measurement as the data about the signal reception quality in the signal reception quality data section.

19. The communication method according to claim 17, wherein said step (o) further comprises the sub-step of:
lowering wireless transmission power of the test packet to a level to cause the data about the signal reception quality to stay above a threshold.

20. The communication method according to claim 17, wherein step (o) further comprises the sub-steps of:
(i) estimating a direction of signals from the data about signal reception quality whenever the test packet or the test response packet is received; and
(ii) controlling antenna directivity to correspond to the estimated direction.

21. The communication method according to claim 20, wherein the controlling recited step (o)(ii) is controlled by an adaptive array antenna.

22. The communication method according to claim 20, wherein the controlling recited step (o)(ii) is controlled by switching between a non-directional antenna and a directional antenna.

23. The communication method according to claim 17, further comprising the step of:
employing the one of the communication stations to perform a communication at the adjusted transmission quality in the time-slots.

24. The communication method according to claim 16, further comprising the steps of:
(p) adjusting the quality of a call-connection by an adjusting method comprising transmission of a test packet in a contention mode communication period whenever no acknowledgment of receipt of a transmitted packet is received by one of said communication stations;
(q) employing one of said communication stations to transmit a time-slot change request packet to the control station when the quality of a call-connection is adjusted by said adjusting method of step (p); and (r) employing one of said communication stations to adjust the transmission quality using another adjusting method when the quality of a call-connection is not adjusted by said adjustment method of step (p).

25. The communication method according to claim 15, further comprising the steps of:
(d) when said call-connection procedure of step (b) cannot be approved by said control station, employing said control station to transmit a time-slot change instruction packet to the one of said communication stations in order to effect a change to said requested leading time slot or said number of time slots; and
(e) employing said one of said communication stations to change the leading time-slot requested in step (b) according to information in the time-slot change instruction packet received from the control station.

26. The communication method according to claim 25, wherein said step (b) further comprises the sub-steps of:
(i) employing one of the communication stations to transmit a test packet; and
(ii) employing one of the communication stations to adjust a transmission quality of a call-connection according to information received in the test packet.

27. The communication method according to claim 25, further comprising the steps of:
(f) employing said control station to maintain a call-connection table through monitoring the call-connection procedure of step (b);
(g) employing said one of said communication stations to transmit a time-slot change request packet to the control station to request a change of a leading time-slot;
(h) employing said control station to access the call-connection table upon receipt of said time-slot change request packet;
(i) employing said control station to examine from information accessed in the call-connection table whether or not said call-connection requested by said one of said communication stations can be established;
(j) employing said control station to transmit a time-slot change instruction packet to said one of said communication stations when the control station determines that said call-connection requested by said one of said communication stations cannot be established;
(k) employing said one of said communication stations to change the leading time-slot upon receipt of the time-slot change instruction packet from the control station.

28. The communication method according to claim 27, wherein said step (b) further comprises the sub-steps of:
(i) employing one of the communication stations to transmit a test packet; and
(ii) employing one of the communication stations to adjust a transmission quality of a call-connection according to information received in the test packet.

29. A wireless network system comprising a control station and plural communication stations controlled by the control station, said system employing a communication procedure using both a contention mode communication period and a contention-free mode communication period as a communication protocol between said communication stations, said communication procedure comprising the operations of:
(a) providing time-slots in the contention-free mode communications period;
(b) employing one of the communication stations to establish a call-connection between itself and another one of the communication stations through executing a procedure of call-connection with said control station in order to communicate in the time-slots; and
(c) when the control station acknowledges that the call-connection is established, performing a packet communication operation involving transmitting packets between said one of said communication stations and said another one of said communication stations in the time-slots while bypassing said control station.

30. A wireless network system comprising a control station and plural communication stations controlled by said control station, said system employing a communication procedure using both a contention mode communication period and a contention-free mode communication period as a communication protocol between said communication stations, said communication procedure comprising the operations of:
(a) providing time-slots in the contention-free mode communication period;
(b) employing one of said communication stations to request a call-connection by requesting allotment of a number of time slots and a leading time-slot address through execution of a call-connection procedure with the control station; and
(c) when said control station acknowledges that a call-connection has been established, employing said one of said communication stations to perform a packet communication operation with another one of said communication stations in the time-slots beginning with the leading time-slot while bypassing said control station.

* * * * *